US011557141B2

(12) United States Patent
Ren et al.

(10) Patent No.: US 11,557,141 B2
(45) Date of Patent: Jan. 17, 2023

(54) TEXT DOCUMENT CATEGORIZATION USING RULES AND DOCUMENT FINGERPRINTS

(71) Applicant: Beijing DiDi Infinity Technology and Development Co., Ltd., Beijing (CN)

(72) Inventors: Liwei Ren, San Jose, CA (US); Qiaoyue Wang, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 420 days.

(21) Appl. No.: 16/720,289

(22) Filed: Dec. 19, 2019

(65) Prior Publication Data

US 2021/0192203 A1   Jun. 24, 2021

(51) Int. Cl.
*G06F 16/13* (2019.01)
*G06V 30/418* (2022.01)
*G06F 40/126* (2020.01)

(52) U.S. Cl.
CPC .......... *G06V 30/418* (2022.01); *G06F 16/137* (2019.01); *G06F 40/126* (2020.01)

(58) Field of Classification Search
None
See application file for complete search history.

(56) References Cited

U.S. PATENT DOCUMENTS

| | | | |
|---|---|---|---|
| 7,260,558 B1 | 8/2007 | Cheng et al. | |
| 7,555,489 B2* | 6/2009 | Bell | G06F 40/30 707/999.102 |
| 7,950,062 B1 | 5/2011 | Ren et al. | |
| 9,692,762 B2* | 6/2017 | Barkan | G06F 21/606 |
| 2005/0251509 A1 | 11/2005 | Pontius | |

(Continued)

FOREIGN PATENT DOCUMENTS

| | | |
|---|---|---|
| CN | 103744964 A | 4/2014 |
| CN | 104982011 A | 10/2015 |

(Continued)

OTHER PUBLICATIONS

PCT International Search Report and the Written Opinion dated Mar. 16, 2021, issued in related International Application No. PCT/CN2020/136877 (9 pages).

(Continued)

*Primary Examiner* — Belix M Ortiz Ditren
(74) *Attorney, Agent, or Firm* — Sheppard Mullin Richter & Hampton LLP (57) ABSTRACT

Methods, apparatuses, and storage media storing instructions for classifying text documents are provided. A plurality of text documents is obtained. The plurality of text documents is classified into one or more document categories based on a plurality of classification rules. Each of the one or more document categories include one or more first text documents of the plurality of text documents. A second text document of the plurality of text documents is classified based on the plurality of classification rules as belonging to none of the one or more document categories. One or more document fingerprints are generated for respective first text documents in the one or more document categories. The second text document is classified into one of the one or more document categories based on the one or more document fingerprints.

20 Claims, 9 Drawing Sheets

(56) References Cited

U.S. PATENT DOCUMENTS

| | | | |
|---|---|---|---|
| 2007/0005589 A1* | 1/2007 | Gollapudi | G06F 16/313 707/E17.084 |
| 2008/0319941 A1* | 12/2008 | Gollapudi | G06F 16/355 707/E17.084 |
| 2009/0006079 A1 | 1/2009 | Van Caldwell et al. | |
| 2010/0050177 A1 | 2/2010 | Goyal et al. | |
| 2010/0094879 A1* | 4/2010 | Donnelly | G06F 16/93 707/E17.071 |
| 2010/0171993 A1* | 7/2010 | Longobardi | G06F 16/93 358/403 |
| 2013/0013603 A1 | 1/2013 | Parker et al. | |
| 2013/0080398 A1 | 3/2013 | Booth et al. | |
| 2014/0259157 A1* | 9/2014 | Toma | H04L 63/1408 726/22 |
| 2014/0279937 A1* | 9/2014 | McHenry | G06F 16/93 707/740 |
| 2015/0106922 A1 | 4/2015 | Zhao et al. | |
| 2016/0299934 A1 | 10/2016 | Karandikar et al. | |
| 2017/0185799 A1 | 6/2017 | Zheng | |

FOREIGN PATENT DOCUMENTS

| | | | |
|---|---|---|---|
| CN | 109582783 A | 4/2019 | |
| CN | 109800308 A | 5/2019 | |
| EP | 1883023 A1 | 1/2008 | |
| WO | 1992/015067 A1 | 9/1992 | |

OTHER PUBLICATIONS

International Search Report and the Written Opinion dated Mar. 22, 2019, issued in International Application No. PCT/US2018/067915 (7 pages).
Yu et al., "Fast and memory-efficient regular expression matching for deep packet inspection", ANCS '06, Dec. 3-5, 2006, San Jose, California, Proceedings of the 2006 ACM/IEEE Symposium on Architecture for networking and communications systems (10 pages).
Boyer-Moore-Horspool algorithm, en.wikipedia.org, Sep. 10, 2017, https://en.wikipedia.org/wiki/Boyer-Moore-Horspool_algorithm (retrieved from internet on Jul. 3, 2018).
Boyer-Moore string-search algorithm, Jun. 12, 2018; https://en.wikipedia.org/wiki/Boyer-Moore_string-search_algorithm (retrieved from internet on Jul. 3, 2018).
Non-Final Office Action dated Jul. 17, 2019, issued in related U.S. Appl. No. 16/031,437 (11 pages).
Non-Final Office Action dated Feb. 25, 2020, issued in related U.S. Appl. No. 16/031,437 (14 pages).
Final Office Action dated Jun. 15, 2020, issued in related U.S. Appl. No. 16/031,437 (15 pages).
Notice of Allowance dated Nov. 4, 2020, issued in related U.S. Appl. No. 16/031,437 (10 pages).
Wikipedia, Document Classification, Sep. 24, 2020, https://en.wikipedia.org/wiki/Document_classification, accessed online Dec. 23, 2020 (5 pages).
Wikipedia, Electronic Discovery, Nov. 3, 2020, https://en.wikipedia.org/wiki/Electronic_discovery, accessed online Dec. 18, 2020 (9 pages).

* cited by examiner

TEXT DOCUMENT CATEGORIZATION USING RULES AND DOCUMENT FINGERPRINTS

TECHNICAL FIELD

The disclosure relates generally to classifying text documents using rules and document fingerprints.

BACKGROUND

Documents have been digitalized for preservation. A collection of a large volume of documents generally is not useful unless a method is available to quickly identify a document or a group of documents from the collection of documents. The task is to assign a document to one or more classes or categories. Classifying documents may be performed manually (or intellectually) or algorithmically. Particularly, text documents can be classified by their content, authors, publication years, publishers, key words, etc.

Text documents that have be classified or categorized may be used in many applications, such as document management, data loss prevention, legal proceedings, data governance, spam filtering, etc. As such, technologies for document classification have become more and more attractive.

SUMMARY

One aspect of the present disclosure is directed to a method for classifying text documents into one or more document categories. A plurality of text documents is obtained. The plurality of text documents is classified into one or more document categories based on a plurality of classification rules. Each of the one or more document categories includes one or more first text documents of the plurality of text documents. A second text document of the plurality of text documents is classified based on the plurality of classification rules as belonging to none of the one or more document categories. One or more document fingerprints are generated for respective first text documents in the one or more document categories. The second text document is classified into one of the one or more document categories based on the one or more document fingerprints.

In some embodiments, the method further includes obtaining the plurality of classification rules from a rule repository. In some embodiments, the method further includes generating an index table correlating the one or more document fingerprints to the respective first text documents and to one or more respective document categories.

In some embodiments, a first document fingerprint of the one or more document fingerprints is generated by obtaining a first sequence of a respective first text document; generating a first hash based on the first sequence; obtaining a second sequence of the respective first text document, the second sequence being shifted from the first sequence; generating a second hash based on the second sequence; and generating the first document fingerprint for the respective first text document based on the first hash and the second hash.

In some embodiments, the first sequence and the second sequence are shifted from each other by a predetermined length of characters. In some embodiments, a same hash function is used to generate the first hash and the second hash.

In some embodiments, a second document fingerprint is generated for the second text document that is classified based on the plurality of classification rules as belonging to none of the one or more document categories. A similarity value is calculated from the second document fingerprint and the first document fingerprint. It is determined whether the similarity value is greater than a predetermined threshold. In response to determining that the similarity value is greater than the predetermined threshold, the second text document is classified into the one of the one or more document categories. In some embodiments, multiple second document fingerprints may be generated for the second text document and multiple similarity values may be calculated for purpose of classifying the second text document.

In yet another aspect, an apparatus is provided. The apparatus includes one or more processors, and a memory configured to store instructions executable by the one or more processors. The one or more processors are configured to execute the instructions to perform operations including: obtaining a plurality of text documents; classifying the plurality of text documents into one or more document categories based on a plurality of classification rules, wherein each of the one or more document categories include one or more first text documents of the plurality of text documents, wherein a second text document of the plurality of text documents is classified based on the plurality of classification rules as belonging to none of the one or more document categories; generating one or more document fingerprints for respective first text documents in the one or more document categories; and classifying the second text document into one of the one or more document categories based on the one or more document fingerprints.

In yet another aspect, a non-transitory computer-readable storage medium is provided. The non-transitory computer-readable storage medium stores instructions that, when executed by one or more processors, cause the one or more processors to perform operations including: obtaining a plurality of text documents; classifying the plurality of text documents into one or more document categories based on a plurality of classification rules, wherein each of the one or more document categories include one or more first text documents of the plurality of text documents, wherein a second text document of the plurality of text documents is classified based on the plurality of classification rules as belonging to none of the one or more document categories; generating one or more document fingerprints for respective first text documents in the one or more document categories; and classifying the second text document into one of the one or more document categories based on the one or more document fingerprints.

These and other features of the apparatuses, systems, methods, and non-transitory computer readable media disclosed herein, as well as the methods of operation and functions of the related elements of structure, will become more apparent upon consideration of the following description and the appended claims with reference to the accompanying drawings, all of which form a part of this specification. It is to be expressly understood, however, that the drawings are for purposes of illustration and description only and are not intended as a definition of the limits of the disclosure. It is to be understood that the foregoing general description and the following detailed description are exemplary and explanatory only, and are not restrictive of the disclosure, as claimed.

BRIEF DESCRIPTION OF THE DRAWINGS

Non-limiting embodiments of the disclosure may be more readily understood by referring to the accompanying drawings in which.

DETAILED DESCRIPTION OF THE EMBODIMENTS

Non-limiting embodiments of the present disclosure will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present disclosure. Various changes and modifications obvious to one skilled in the art to which the present disclosure pertains are deemed to be within the spirit, scope and contemplation of the present disclosure as further defined in the appended claims.

Text documents can be classified by a plurality of methods such as a manual process, a text clustering method, a descriptive method, or a supervised machine learning. A manual process categorizes text documents based on people's knowledge with/without tools. This can take a lot of time to classify documents but could potentially be very accurate. Text clustering is an approach of unsupervised machine learning. In this approach, a text document is presented by a vector of textual features, which can be words. For example, the k-mean method that partitions a text set into k non-overlapping categories may be used to classify text documents. The descriptive methods are ruled-based approaches. The rules describe what attributes a text document has and how the text document is categorized. The rules may be generated by an expert and stored in a rule repository. Once the rules are deployed, the categorization process can be automatically implemented with a rule-based categorization engine.

Figure 1:
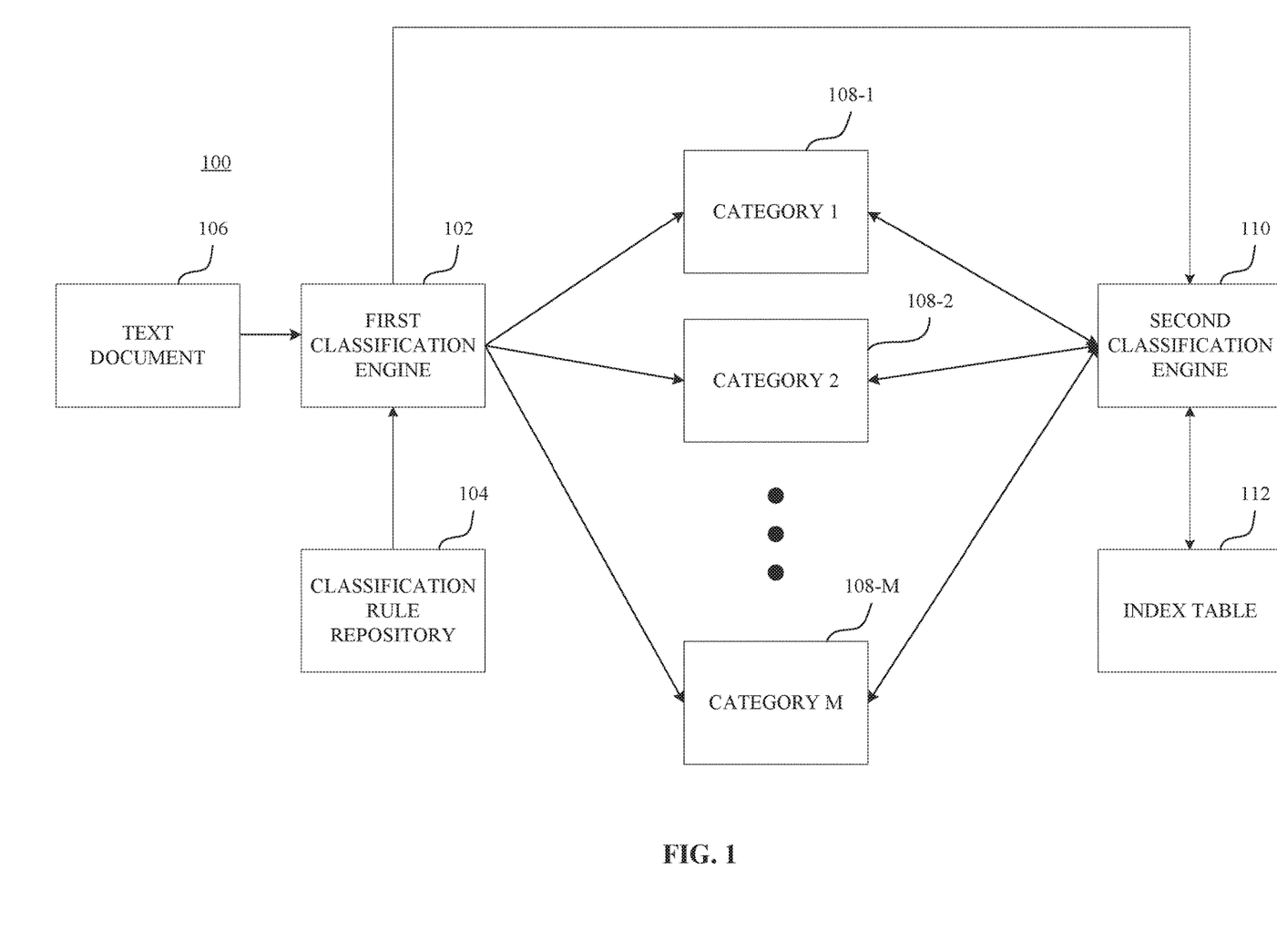
FIG. 1 is a block diagram illustrating a document classification system according to one example embodiment.

Techniques disclosed herein enables classifying/categorizing text documents in a more efficient and accurate manner. Reference is made to FIG. 1. FIG. 1 is a block diagram illustrating a document classification system 100 according to one example embodiment. The document classification system 100 includes a first classification engine 102 configured to obtain classification rules from a classification rule repository 104. The first classification engine 102 is further configured to obtain text documents 106, and use the classification rules to classify the text documents into one or more document categories 108-1, 108-2, . . . , 108-M (collectively 108). Each of the one or more document categories 108 includes one or more first text documents. However, in some instances, it is possible that some of the text documents do not belong to any of the document categories 108 based on the classification rules. To solve the problem, the document classification system 100 further includes a second classification engine 110. The second classification engine 110 is configured to generate one or more document fingerprints for respective first text documents in the one or more document categories 108. Based on the document fingerprints, the second classification engine 110 is configured to classify the text documents that cannot be classified into the document categories 108 using the classification rules into one or more of the document categories 108.

First, the first classification engine 102 classifies text documents using a plurality of classification rules. The classification rules may be generated by machines or users. For example, a machine learning algorithm may be trained by a set of text documents to generate classification rules for classifying future text documents. The rules can be used to classify text documents into one or more document categories (groups/classes) 108. For example, the rules can classify text documents having similar attributes into the same category.

In some embodiments, a set of keywords can be used to describe a text document category. Further, a few regular expression patterns can be used to describe some entities in the text such as a social security number (SSN), a credit card number, an identification (ID) number, a bank account number, a phone number, a home address, etc. In some embodiments, text file types such as Portable Document Format (PDF), Postscript (PS), Word, or PowerPoint (PPT) can be used to classify documents. In some embodiments, metadata of a text document, such as an author, a time stamp, a text file size, a file type (e.g., PDF/PS/Word/PPT) can be employed as rules to classify text documents. These attributes are either recognized by file extensions, or true file types are recognized by tools. In some embodiments, a rule can categorize documents by the languages that the text is written, such as Chinese, English, French, etc. If a text document is written in more than one language exceeding certain percentiles, the document can be classified into more than one category by the languages.

To support the descriptive rules for classifying text documents, the first classification engine 102 can include a keyword matching application programming interface (API) that can identify keywords from a text document. The keyword matching API may be developed by implementing string matching algorithms such as Boyer-Moore-Horspool algorithm, Karp-Rabin algorithm, Ren-Xu algorithm, etc. The keyword matching API can employ a keyword library to identify keywords in text documents for classification. In some embodiments, a text classification engine can include a regular expression matching API that can identify all entities presented by regular expression patterns. Various open source regular expression APIs have been developed including the PCRE APIs in C language.

In some embodiments, APIs that can recognize all written languages of the text can be employed in a text document classification engine. For example, the first classification engine 102 can also include a software tool or API (file type recognizer) that can recognize the true type of a text document by its content in addition to by the file name extension. The first classification engine 102 can also include a software tool or APIs (file converter) that can extract textual content from a formatted document such as PDF. For example, the extracted text can be encoded in UTF-8 so that the written languages in the document can be processed. The file converter may be integrated with a file type recognizer. Example tools may include dtSearch and KeyView.

Techniques of using keywords to classify text documents are now described below as an example. The first classification engine 102 acquires keywords appeared in a text document. In one embodiment, at least N different keywords are extracted from the text. Each of the N different keywords is assigned a score based on a predetermined database. The scores of the keywords are then added to generate a final score for the text document. The documents may then be classified based on their final keyword scores. A plurality of keyword score thresholds may be defined to generate one or more document categories. For example, a classification rule based on keyword scores may include two thresholds, a first threshold and a second threshold, that can classify documents into three categories. If a keyword score of a document is less than the first threshold, the document can be classified into a first category. If a keyword score of a document is not less than the first threshold and is less than the second threshold, the document can be classified into a second category. Further, if a keyword score of a document is not less than the second threshold, the document can be classified into a third category.

In some embodiments, the first classification engine 102 may use rules that classify documents based on regular expression patterns in the documents. For example, the first classification engine 102 may be configured to recognize regular expression patterns such as what constitutes an SSN, a credit card number, an ID number, a bank account number, a phone number, a home address, etc. Each of these regular expression patterns may be referred to as an entity of a document. For example, a rule may require that a document needs to include at least N entities in order to be classified into a category. Another example rule may require that a document needs to include at least K types of entities in order to be classified into a category. Yet another example rule may require that a document needs to include all required entities in order to be classified into a category.

In some embodiments, rules for classifying text documents may be used to generate new rules. For example, Boolean operations may be applied to existing rules to create composite rules, which, in turn, may be used to classify text documents.

Figure 2:
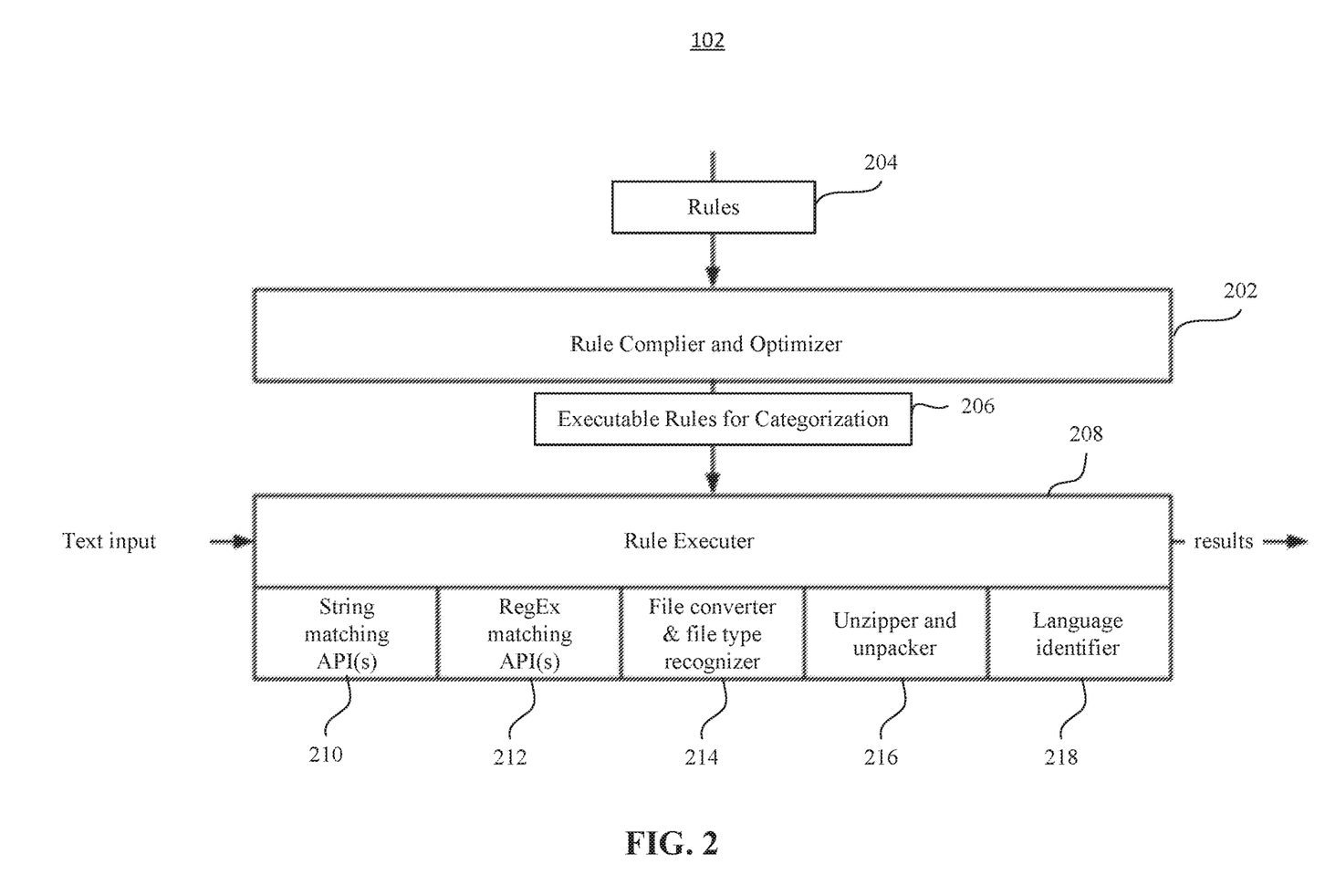
FIG. 2 is a block diagram depicting the first classification engine of FIG. 1 according to one example embodiment.

FIG. 2 is a block diagram depicting the first classification engine 102 according to one example embodiment. The first classification engine 102 includes a rule complier and optimizer 202 configured to receive a set of rules 204 for document classification and compile and/or optimize rules to be in a form that can be executable by machines. The rule complier and optimizer 202 then output executable rules 206 to a rule executer 208. Based on the executable rules 206, the rule executer 208 classifies text documents into one or more document categories (108 in FIG. 1). In some embodiments, the rule executer 208 may include one or more specialty APIs or tools to assist in the document classification process. For example, referring to FIG. 2, the rule executer 208 includes one or more string matching APIs 210, one or more regular expression (RegEx) matching APIs 212, a file converter and file type recognizer 214, an unzipper and unpacker 216, and a language identifier 218.

The string matching APIs 210 are configured to identify keywords included in a text document that match the keywords of a dictionary. Based on a matching result and the executable rules, the rule executer 208 classifies the text document into one or more document categories. The RegEx matching APIs 212 are configured to identify entities (regular expression items) that match entities of an entity dictionary. Based on a matching result and the executable rules, the rule executer 208 classifies the text document into one or more document categories. The file converter and file type recognizer 214 is configured to convert text documents into a format that can be processed by the rule executer 208 and to recognize a type of the document. The unzipper and unpacker 216 is configured to unzip and unpack a document so that it may be processed by the rule executer 208. The language identifier 218 is configured to identify one or more languages that are used in a text document.

Referring back to FIG. 1, once the first classification engine 102 has classified a plurality of text documents 106 into the document categories 108 based on the classification rules, each of the document categories contains one or more text documents. The second classification engine 110 is then configured to generate one or more document fingerprints for the documents in each category. In some embodiments, second classification engine 110 may generate at least one document fingerprint for each document that has been classified in a document category 108. A document fingerprint may be a form of identifier for a respective document.

A text document may refer to a collection of data or information stored in one unit. Data or information may be stored as text of the text document. For example, a text document may include an electronic document. A text document may be identified by one or more text document identifiers, such as a text document name or a text document fingerprint. A text document may include multiple characters. A character may refer to a symbol having one or more meanings, such as a symbol forming part of a word, depicting a letter, depicting a numeral, expressing grammatical punctuation, representing mathematical concepts, or representing other information. A character may be selected from letters of a set of letters, numerals of a numbering system, or special symbols (e.g., ampersand symbol "&," percent symbol "%," assign "@"). A string of characters may refer to a sequence of characters. A string of characters may include contiguous characters within a text document. The characters/strings of characters within the text document may form text of the text document. Text of the text document may refer to written, printed, or recorded information of the text document. Text of the text document may include visual representation of information included in the text document. A string of characters (T) may have a length (L) and may include characters (c). A string of characters may be written as $T = c_1 c_2 \ldots c_L$.

Obtaining a string of characters may include one or more of accessing, acquiring, analyzing, determining, examining, identifying, loading, locating, opening, receiving, retrieving, reviewing, storing, or otherwise obtaining the string of characters. The second classification engine 110 may obtain the string of characters from the text document that has been classified into one of the document categories 108.

In some embodiments, obtaining a string of characters within a text document may include: obtaining the text document; extracting the text of the text document; and normalizing the extracted text of the text document. The second classification engine 110 may extract the text of the text document and normalize the extracted text of the text document. The string of characters may be selected from the normalized text of the text document. Such process for obtaining strings of characters may enable the second classification engine 110 to generate text document fingerprint for different types of text documents. For example, text documents may store information using different formats (e.g., documents of different formats) and the second classification engine 110 may normalize text extracted from the text documents. For example, the second classification engine 110 may obtain documents of different types (Word document, PDF document, PowerPoint document), extract text of the documents, and normalize the text extracted from the documents as sequences of UTF-8 characters. Such process may result in the second classification engine 110 obtaining standardized strings of characters from text documents that have text encoded differently.

The second classification engine 110 is configured to select multiple sequences from the string of characters. Multiple sequences may be selected from the string of characters to be used in generating a text document fingerprint. A sequence may refer to a portion of a string of characters. A sequence may include contiguous characters within a string of characters. Multiple sequences that are selected from the string of characters may be related to each other. For example, the second classification engine 110 may select a first sequence from the string of characters and then select a second sequence from the string of characters based on the first sequence. The second sequence may be shifted from the first sequence. At least a portion of the second sequence may overlap with the first sequence. These sequences may be used to generate a text document fingerprint which is unique and robust (resilient to change) so that the text document fingerprint may uniquely identify the text document.

Such selection of multiple sequences from the string of characters may facilitate fast generation of text document fingerprints with low probability of collisions. Use of a single sequence of characters from a text document to generate a text document fingerprint may result in multiple text documents sharing the same text document fingerprint. To reduce the probability of collisions, a single sequence of characters from a text document may be processed using multiple functions, such as different hash functions, to generate information for the text document fingerprint. However, use of multiple functions (e.g., different hash functions) may increase computation times to generate text document fingerprints.

The selection of multiple sequences where one of the sequences is shifted from another sequence enables generation of unique and robust fingerprints. For instance, the first sequence may be selected from the string of characters by using a hash function on one or more sequences of the string. The sequence of the string that results in the hash of the sequence equaling O mod p (h=O mod p) may be selected as the first sequence. The second sequence may be selected by shifting away from the first sequence in the forward or reverse direction by a certain number of characters. For example, the second sequence may be selected from the first sequence by shifting away from the first sequence in the forward or reverse direction by a predetermined character such as one or two characters. Such selection of the second sequence may allow for use of an iterative formula to quickly generate unique and robust text document fingerprints. Other selection of the first sequence of from the string of characters are contemplated.

The second classification engine 110 may be configured to generate hashes based on the multiple sequences from the string of characters. For example, the second classification engine 110 may generate a first hash based on the first sequence and generate a second hash based on the second sequence. The second classification engine 110 may generate hashes using the same hash function, such as a rolling hash. The use of a rolling hash may enable quick calculations of hash as a prior calculation of the hash may be reused in a subsequent calculation of the hash. For example, the second classification engine 110 may generate the first hash by performing a first calculation of a hash function based on characters within the first sequence. The second classification engine 110 may generate the second hash by performing a second calculation of the same hash function based on characters within the second sequence. The second classification engine 110 may reuse a portion of the first calculation of the hash function in performing the second calculation of the hash function.

The length (w) of the sliding window of the rolling hash may be set or predefined. The hash function, such as the Karp-Rabin function, may be written as $h_w(x_1, x_2, \ldots, x_w) = x_1 b^{w-1} + x_2 b^{w-2} + \ldots + x_{w-1} b + x_w$. This may be an iterative formula with only two additions and two multiplications where ($b^{w-1}$) is a constant. For example, for k=2 to L−w+1, $h_k$ may be calculated from $h_{k-1}$ with the iterative formula. That is, $h_{k-1}$ may be used when calculating $h_k$ by the iterative formula. The values of b and p may be set/predefined, such as p=1021 and b=2. Use of other values and other hash functions, such as Adler-32, are contemplated.

Such generation of hashes using the same hash function for sequences that are shifted from each other may generate unique values for a text document fingerprint. Rather than using two separate hash functions to generate values for a text document fingerprint, the same hash function may be used to iteratively generate values for the text document fingerprint. The shifting of sequences provides for unique generation of hash to avoid collision while allowing prior calculation of hash to be reused in new calculation of hash.

The second classification engine 110 is configured to generate a fingerprint for the text document based on hashes of the multiple sequences, such as the first hash and the second hash. For example, the second classification engine 110 may initialize a hash list and add one or more of the hash values calculated for the selected sequences to the hash list. For example, based on $h_k$=O mod p, the second classification engine 110 may add $h_{k-2}$ to the hash list (based on the second sequence being shifted from the first sequence by two characters in the reverse direction). The calculations for $h_k$ and $h_{k-1}$ may be stored for reuse in new hash calculation, and the value for $h_{k-2}$ may be discarded. In some embodiments, other information relating to the selected sequences or the hashes may be used in generating the fingerprint for the text document. For instance, in addition to adding $h_{k-2}$ to the hash list, k−2 may be added to the hash list (e.g., appending <$h_{k-2}$, k−2> to the hash list). The hash list may form the fingerprint for the text document. The hash list may be used to generate the fingerprint for the text document.

Figure 3:
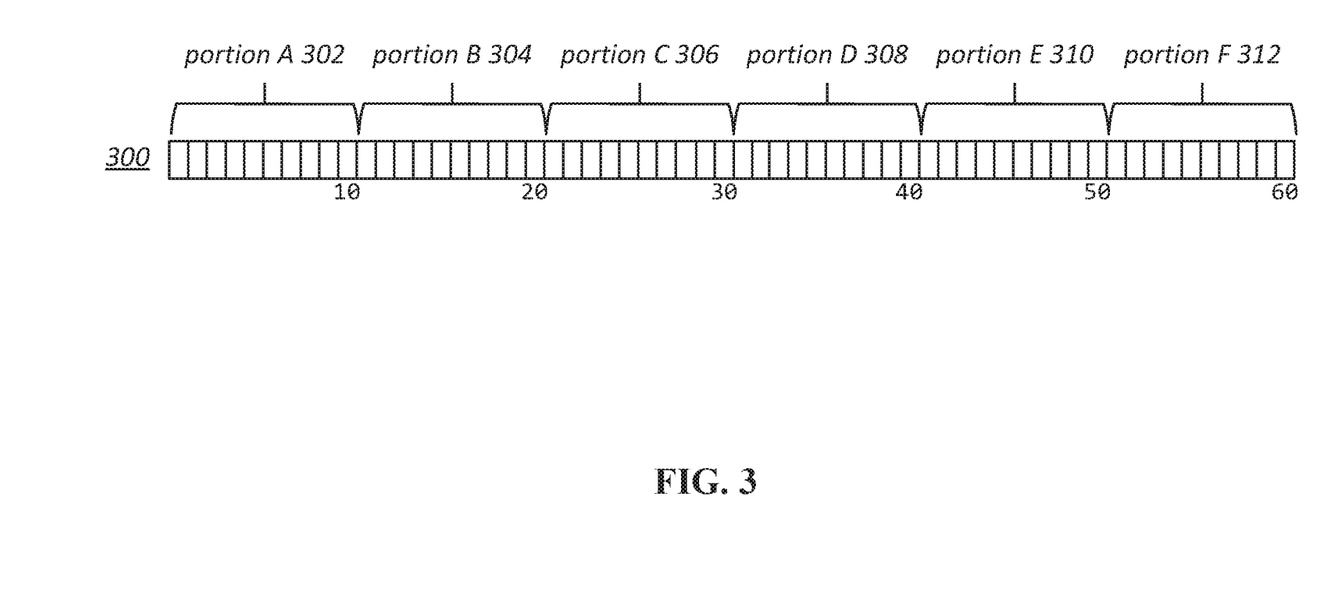
FIG. 3 illustrates an example string of characters and example string portions according to one example embodiment.

FIG. 3 illustrates an example string of characters 300 and example string portions 302, 304, 306, 308, 310, 312, in accordance with various embodiments of the disclosure. One or more sequences of characters may be selected from the string of characters 300 for use in generating file fingerprints. For example, the string of characters 300 may be divided into the string portions 302, 304, 306, 308, 310, 312. The string portions 302, 304, 306, 308, 310, 312 may individually comprise k-grams, where a k-gram comprises a sequence of k-characters (contiguous characters) from the string of characters 300. One of the string portions 302, 304, 306, 308, 310, 312 may be selected as a first string portion to be used in generating file fingerprints. The first string portion may include a first sequence of k-characters from the string of characters 300. For example, the string portion that includes a sequence of k-characters that result in hash equaling O mod p may be selected. Other selections of the first string portion are contemplated.

A second sequence may be selected based on the first sequence. The second string portion may include a second sequence of k-characters from the string of characters 300. The second sequence of k-characters may be selected by shifting from the first sequence of k-characters by n-characters. For example, the second sequence of k-characters may be selected by shifting from the first sequence of k-characters by one or two characters in a reverse direction (towards the start of the string of characters 300) or by shifting from the first sequence of k-characters by one or two characters in a forward direction (towards the end of the string of characters 300).

Figure 4A:
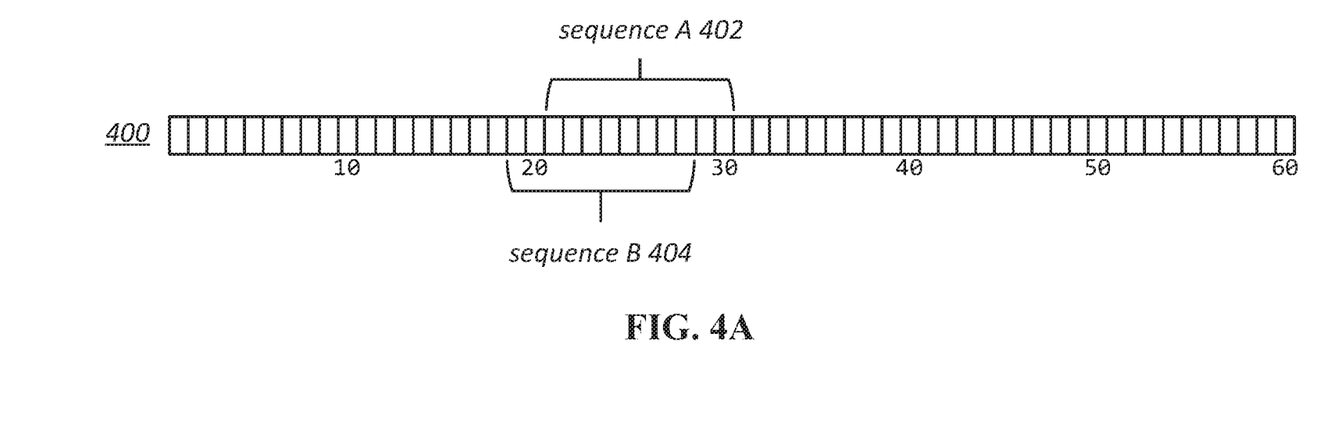
FIG. 4A illustrates example selection of sequences from a string of characters according to one example embodiment.
Figure 4B:
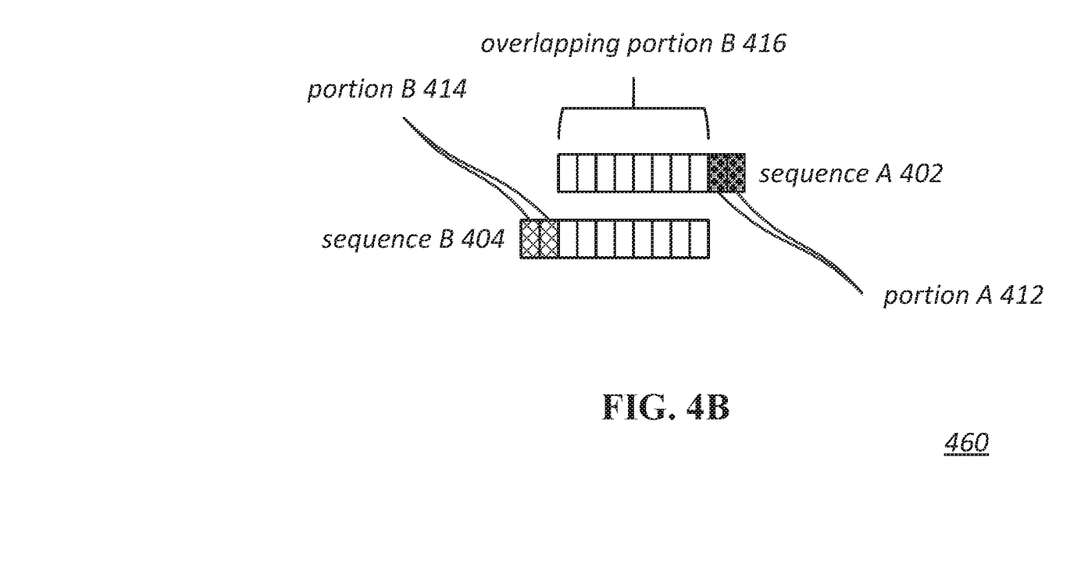
FIG. 4B illustrates example portions of sequences according to one example embodiment.

FIG. 4A illustrates example selection of sequences 402, 404 from a string of characters 400, in accordance with various embodiments of the disclosure. For example, the sequence A 402 may be selected from the string of characters 400 as a first sequence in generating values for text document fingerprints. The sequence A 402 may include ten contiguous characters within the string of characters 400. A first hash may be generated based on the sequence A 402. The generation of the first hash may include a first calculation of a hash function based on the characters within the sequence A 402. The sequence B 404 may be selected from the string of characters 400 as a second sequence in generating values for text document fingerprints. The sequence B 404 may include ten contiguous characters within the string of characters 400. The sequence B 404 may be selected by shifting from the sequence A 402 by two characters in the reverse direction. A second hash may be generated based on the sequence B 404. The generation of the second hash may include a second calculation of the hash function based on the characters within the sequence B 404. The second calculation of the hash function may reuse a portion of the first calculation of the hash function FIG. 4B illustrates example portions 412, 414, 416 of the sequences 402, 404, in accordance with various embodiments of the disclosure. The sequence A 402 includes the portion A 412, which includes two characters at the end of the sequence A 402. The two characters in the portion A 412 are not included in the sequence B 404. The sequence B 404 includes the portion B 414, which includes two characters at the start of the sequence B 404. The two characters in the portion B 414 are not included in the sequence A 402. The sequence A 402 and the second B 404 both include the overlapping portion B 416, which includes eight characters that are in both sequences 402, 404. The calculation of a hash function based on the sequence A 402 may reuse a portion of the calculation of the hash function based on the sequence B 404. That is, calculation of the hash function based on the sequence A 402 may reuse the computation of the hash function using the characters within the overlapping portion B 416. For instance, the calculation of the hash function based on the sequence A 402 may take the prior calculation of the hash function based on the sequence B 404, remove the contribution of the characters within the portion B 414 from the prior calculation, and add to the prior calculation the construction of the characters within the portion A 412.

Referring back to FIG. 1, after the document fingerprints are generated for the documents in the document categories 108, the second classification engine 110 may generate an index table 112 that correlates each document fingerprint to a respective first text document and to one or more respective document categories the respective first document is assigned to. In some embodiments, one text document may be classified as belonging to two or more document categories. For example, a Word document that contains financial information may be classified into a category that contains Word documents and another category that contains financial information documents.

In some embodiments, when the first classification engine 102 fails to classify a second text document based on the classification rules, the first classification engine 102 forwards the second text document to the second classification engine 110 for further processing. Upon receiving the second text document that has not been classified to the document categories 108, the second classification engine 110 may generate a second document fingerprint for the second text document using the techniques described above for generating first document fingerprints for the first text documents in the one or more categories. The second classification engine 110 then uses the second document fingerprint for the second text document to classify the second text document.

For example, the second classification engine 110 can calculates a similarity value from the second document fingerprint and a first document fingerprint of a first text document in the document categories 108. The second classification engine 110 determines whether the similarity value is greater than a predetermined threshold. In response to determining that the similarity value is greater than the predetermined threshold, the second classification engine 110 classifies the second text document into the one or more document categories where the first text document is assigned to. For example, when the similarity value is greater than the predetermined threshold, the second classification engine 110 can determine that the second text document is similar to the first text document that has been classified into one or more document categories. Because the text documents are similar, the second classification engine 110 can classify the second text document to the one or more document categories where the first text document is assigned to.

If the similarity value is not greater than a predetermined threshold, the second classification engine 110 determines whether there are more first document fingerprints in the index table 112 for the first text documents in the categories 108. If so, the second classification engine 110 repeats the processes of calculating a similarity value and determining whether the similarity value is greater then the threshold until all first document fingerprints in the index table 112 have been compared with the second document fingerprints of the second text document. At that point, if there is still no similarity value greater than the threshold, the second classification engine 110 determines that the second text document does not belong to any of the document categories 108 and notes that the second text document as unclassified.

At a later time, when more documents have been included in the document categories 108 or more document categories have been generated based on new classification rules, the second classification engine 110 may revisit the second text document and compare the second document fingerprint with new document fingerprints in the index table 112 to try to classify the second text document.

Figure 5:
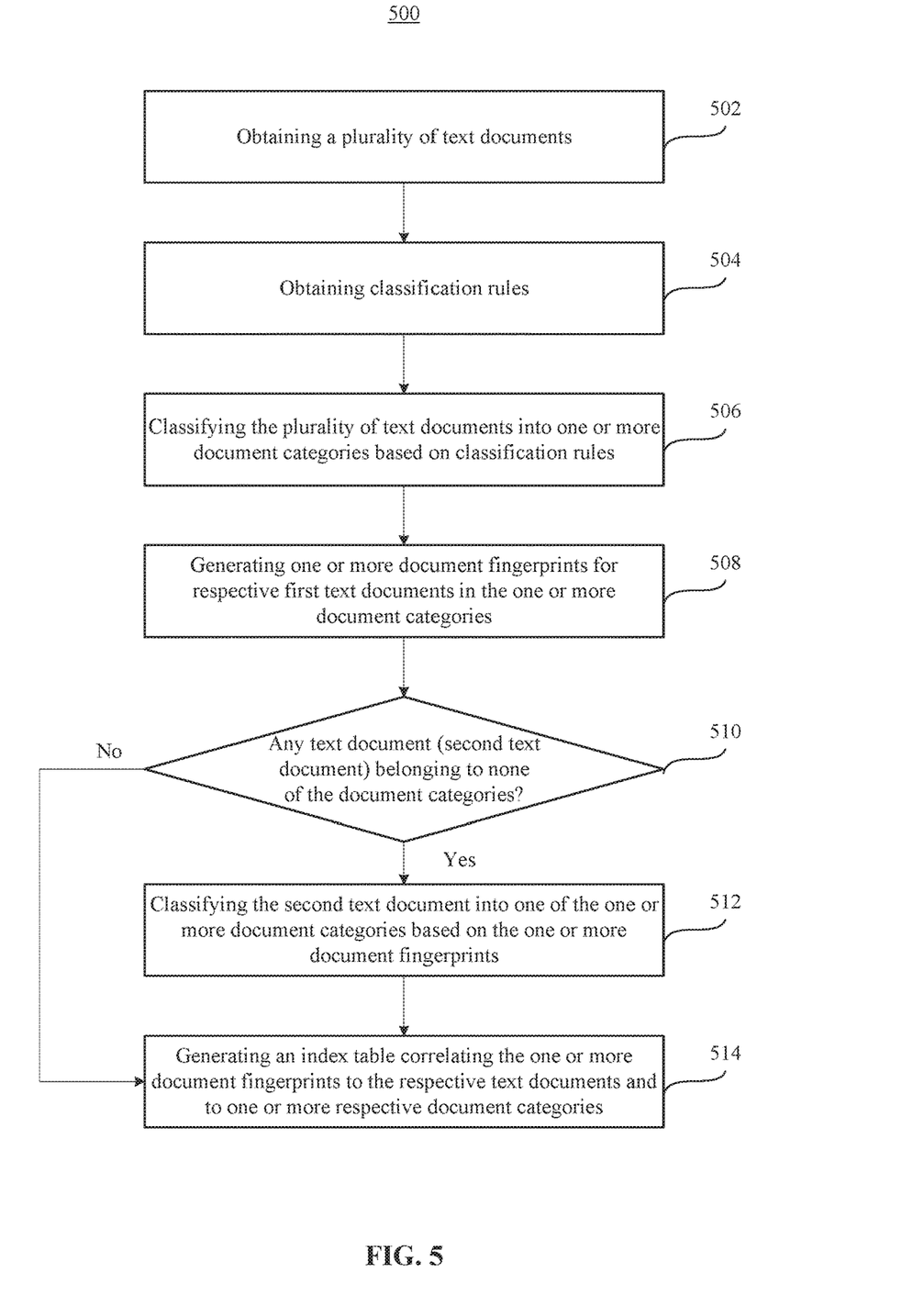
FIG. 5 is a flow chart illustrating a method for classifying text documents according to one example embodiment.

Reference is now made to FIG. 5. FIG. 5 is a flow chart illustrating a method 500 for classifying text documents according to one example embodiment. The method 500 may be performed by a document classification system, such as the document classification system 100 in FIG. 1. At 502, the document classification system obtains a plurality of text documents. For example, the text documents may be any documents that need to be classified, such as corporate documents, documents in a legal proceeding that are the subject of a discovery process, documents of a library, etc. At 504, the document classification system obtains classification rules for classifying the text documents. The classification rules may be provided by an expert system that uses computers to generate rules or by a user based on the needs of the user's tasks. The rules may use different attributes of the text documents to classify them. For example, the rules may use keywords, regular expressions, file types, metadata, and languages contained in the text documents to classify the text documents.

At 506, the document classification system classifies the plurality of text documents into one or more document categories based on a plurality of classification rules. Each of the document categories contains one or more first text documents of the plurality of text documents. In some embodiments, a document may be classified as belonging to two or more categories. At 508, the document classification system generates one or more document fingerprints for respective first text documents in the one or more document categories. For example, the document classification system may generate one or more document fingerprints for each respective first text document contained in the one or more document categories. A document fingerprint may uniquely identify the respect first text document.

At 510, the document classification system determines whether any (second) text document in the plurality of text documents belongs to none of the one or more document categories. This may happen when the second text document could not be classified/categorized based on the classification rules. If the document classification system cannot classify a second text document into any of the one or more document categories based on the classification rules, at 512 the document classification system classifies the second text document into one of the one or more document categories based on the one or more document fingerprints. For example, the document classification system may generate a second document fingerprint for the second text document and compare it with the document fingerprints of the first text documents contained in the document categories. When the document classification system determines that the second document fingerprint is similar to a document fingerprint for a respective first text document, the document classification system classifies the second text document to a respective document category that contains the respective first text document. If the respective first text document is contained in multiple document categories, the second text document can also be classified to those multiple document categories. At 514, the document fingerprints are stored in an index table that correlates the document fingerprints to their respective text document(s) and to respective document category or categories. In some embodiments, the document classification system may extract and include in the index table other information about the text documents, such as authors, timestamps when the documents are created or altered, keywords, etc. It should be understood that the sequence of the operations 502-514 may be altered and is not limited to those shown in FIG. 5.

Figure 6:
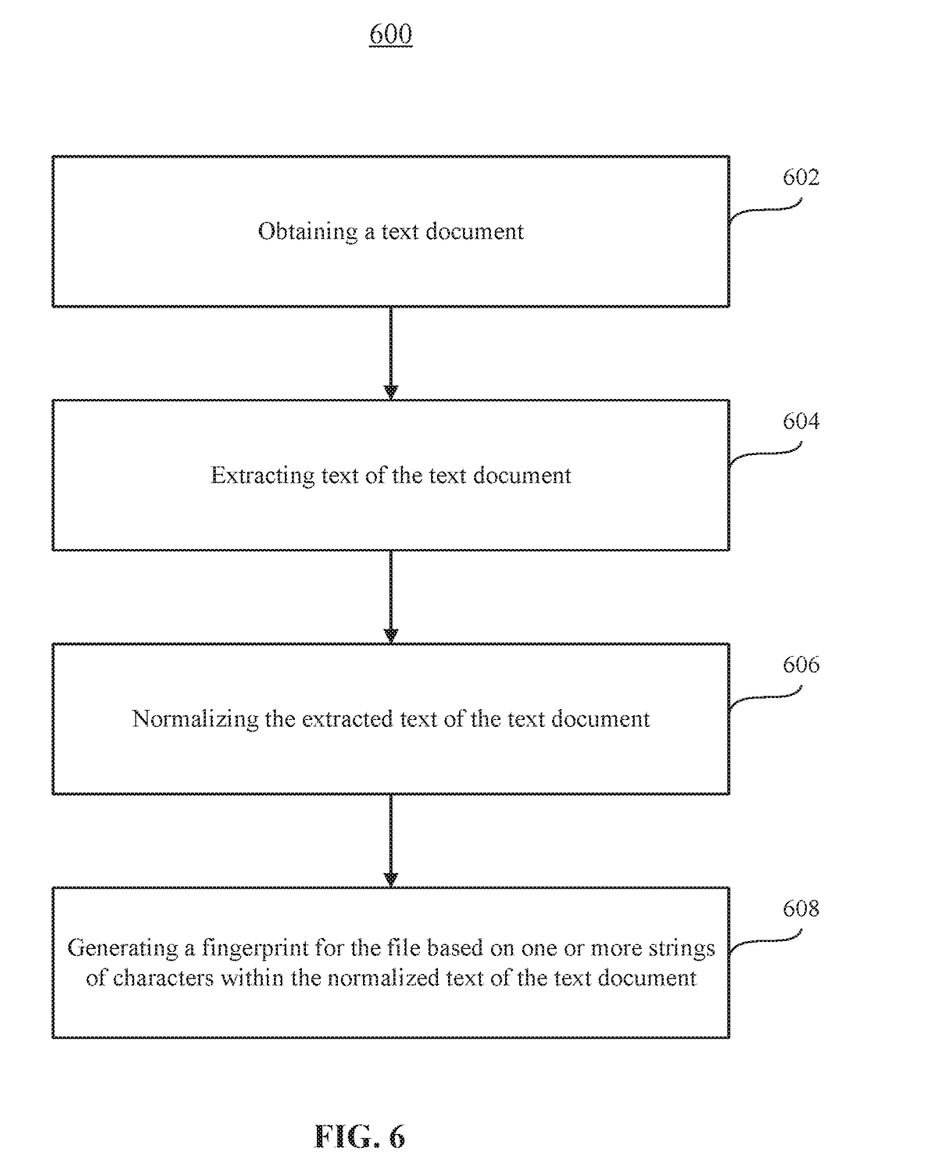
FIG. 6 is a flow chart illustrating a method for generating document fingerprints for text documents according to one example embodiment.

FIG. 6 is a flow chart illustrating a method 600 for generating document fingerprints for text documents according to one example embodiment. At 602, a text document is obtained. The text document may include text. At 604, the text of the text document is extracted. Text extraction may include extracting structured information from unstructured or semi-structured information within the text document. At 606, the extracted text of the text document is normalized. Text normalization may include conversion of the extracted text into a standard form, such as conversion of document into a plain text encoded in UTF-8. Text normalization may include removal of non-informative characters (e.g., white spaces). At 608, a fingerprint for the text document may be generated based on one or more strings of characters within the normalized text of the text document.

Figure 7:
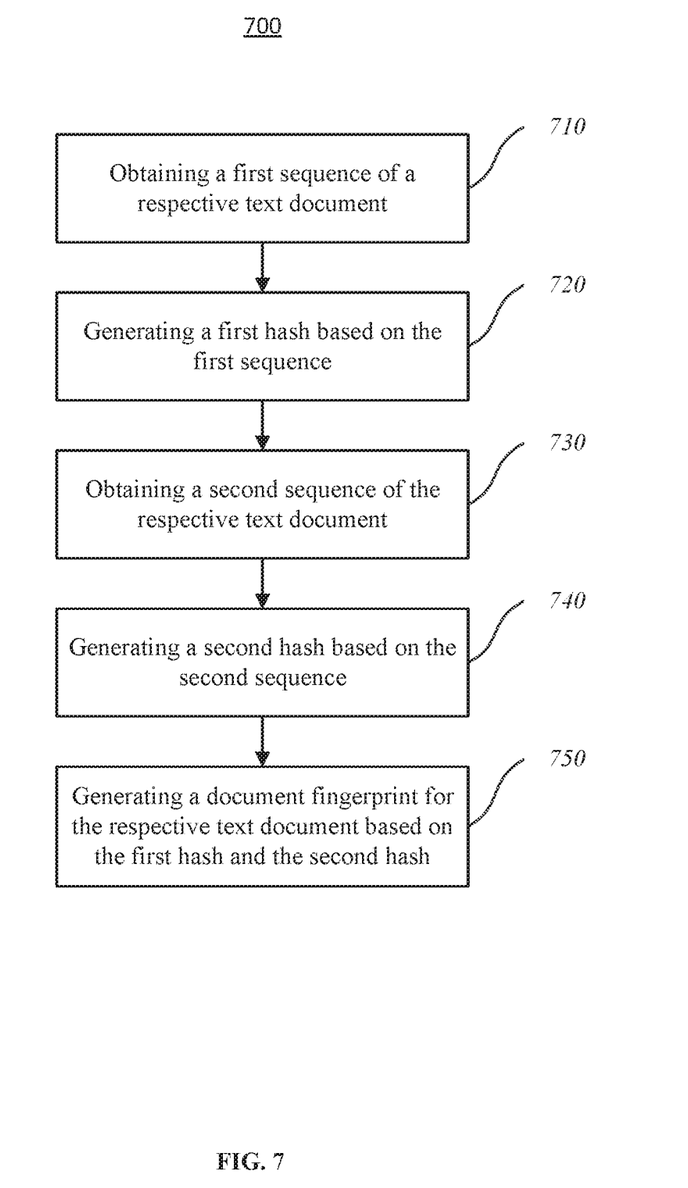
FIG. 7 is a flow chart illustrating another method for generating document fingerprints for text documents according to one example embodiment.

FIG. 7 is a flow chart illustrating another method 700 for generating document fingerprints for text documents according to one example embodiment. The method 700 may be performed by a document classification system, such as the document classification system 100 in FIG. 1. At 710, the document classification system obtains a first sequence of characters of a text document. For example, the document classification system may parse the text document to obtain a string of characters. The document classification system then selects a first sequence from the string. At 720, the document classification system generates a first hash based on the first sequence. For example, the document classification system may hash the first sequence with a hash function to generate the first hash for the first sequence. Any hash function may be employed to generate the first hash. In one embodiment, a rolling hash function may be used as it allows a subsequent hash calculation to reuse results from prior hash calculations.

At 730, the document classification system obtains a second sequence of characters of the text document. The second sequence is different from the first sequence. In some embodiments, the second sequence is shifted from the first sequence. The second sequence may be shifted from the first sequence by a predetermined number of characters in a forward or reverse direction with respect to the first sequence. At 740, the document classification system generates a second hash based on the second sequence. For example, the document classification system may hash the second sequence with a hash function to generate the second hash for the second sequence. The hash function may be the same as that used to hash the first sequence. At 750, the document classification system generates a document fingerprint for the text document based on the first hash and the second hash. For example, the document fingerprint for the text document may be a list of hashes including the first hash and the second hash. In some embodiments, the fingerprint for the text document may include more than two hashes generated from sequences of the text document. It should be understood that the method 700 may be used to generate document fingerprints for the documents that have been classified into document categories and for document that cannot be classified based on classification rules.

Figure 8:
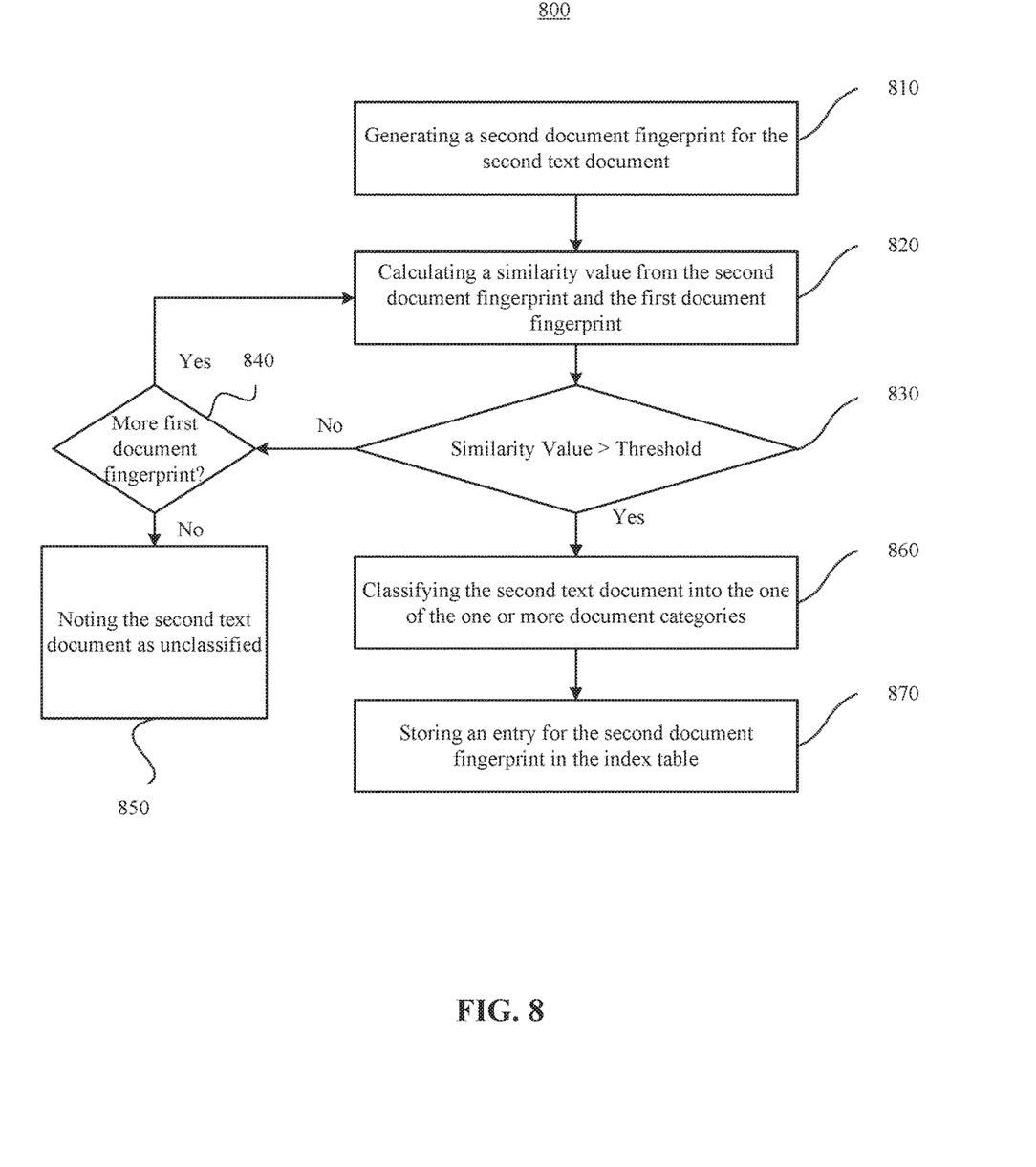
FIG. 8 is a flow chart illustrating a method for classifying a text document based on document fingerprints of documents that have been classified using classification rules, according to one example embodiment.

FIG. 8 is a flow chart illustrating a method 800 for classifying a text document based on document fingerprints of documents that have been classified using classification rules, according to one example embodiment. The method 800 may be performed by a document classification system, such as the document classification system 100 in FIG. 1. At 810, the document classification system generates a second document fingerprint for a second document that cannot be classified using a set of document classification rules. As described above, in some instances, a text document may not be classified using a set of document classification rules. In some embodiments, a text document that has been classified using the document classification rules can be re-classified using document fingerprints. At 820, the document classification system calculates a similarity value from the second document fingerprint and the document fingerprint of a first text document that has been classified into one or more document categories. In some embodiments, the similarity value may be scaled to between zero and one. The document fingerprints are less likely related to each other when the similarity value is close to zero. In contrast, when the similarity value is close to one, the document fingerprints are highly likely related to each other.

At 830, the document classification system determines whether the similarity value is greater than a predetermined threshold. For example, the predetermined threshold may be 50% or more, 60% or more, 70% or more, 80% or more, 90% or more, 95% or more, or 99% or more. When the similarity value is greater than the predetermined threshold, the document classification system determines that the second text document that needs to be classified is similar to the first text document that has been classified into one or more document categories.

If the similarity value is not greater than the predetermined threshold (No at 830), at 840 the document classification system determines whether there are more first document fingerprints of first text documents that have been classified into one or more document categories that have not been used to compare with the second document fingerprint. If more first document fingerprints are available (Yes at 840), the method 800 returns to operation 820 to calculate another similarity value. If there is no more first document fingerprint available for comparison (No at 840), at 850 the document classification system notes the second text document as unclassified yet. At a later time, when more documents have been included in the document categories or more document categories have been generated based on new classification rules, the document classification system may revisit the second text document and compare the second document fingerprint with new document fingerprints to try to classify the second text document.

If the similarity value is greater than the predetermined threshold (Yes at 830), at 860 the document classification system classifies the second text document into the one of the one or more document categories. For example, when the similarity value is greater than the predetermined threshold, the document classification system can determine that the second text document is similar to the first text document that has been classified into one or more document categories. Because the text documents are similar, the document classification system classifies the second text document to the one or more document categories where the first text document is assigned to. In some embodiments, after the second text document is classified into one or more document categories, at 870 the document classification system stores an entry in an index table that correlates the second document fingerprint to the second text document and to the one or more document categories.

In some embodiments, a text document that has been classified using the document classification rules can be re-classified using document fingerprints. For example, the document classification system can compare a document fingerprint of a text document has been classified into one or more document categories with other document fingerprints of classified text documents. The document classification system may perform operations 820-870 in FIG. 8 to re-classify a text document.

After the text documents are classified/categorized, the classified documents or document fingerprints may be implemented in various applications, including document management, data loss prevention (DLP), e-discovery, data governance, spam filtering, etc. For example, a DLP system can include a deep content inspection (DCI) engine that includes fingerprint matching capability. The document classification methods disclosed herein may be implemented as a part of a DLP system. For example, the document fingerprints of the document categories that are obtained from the document classification methods can be deployed into a DLP server. The DLP server sends the document fingerprints to all endpoints that install DLP agents or DLP Network Gateway.

In some embodiments, an e-discovery system may need to partition a set of files/documents into groups for case analyses during a legal investigation process. The process of file grouping would help review and analysis processes in the e-discovery model. The document classification methods disclosed herein may be implemented for the file grouping process.

Figure 9:
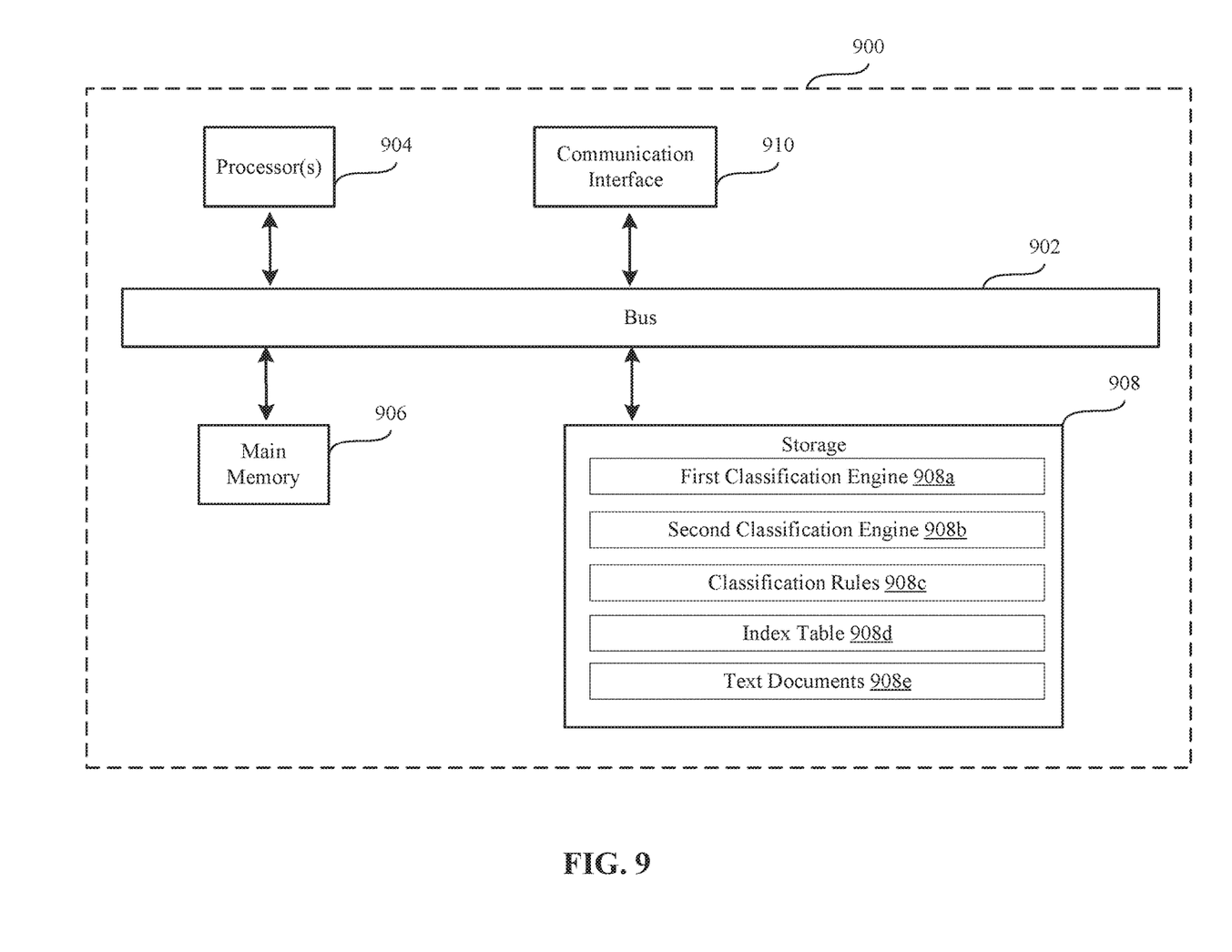
FIG. 9 is a block diagram that illustrates a computer system upon which any of the embodiments described herein may be implemented, according to one example embodiment.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render computer system 900 into a special-purpose machine that is customized to perform the operations specified in the instructions. Main memory 906 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 900 may implement the techniques described herein using customized hard-wired logic, one or more application-specific integrated circuits (ASICs) or field-programmable gate arrays (FPGAs), firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 908. Execution of the sequences of instructions contained in main memory 906 causes processor(s) 904 to perform the process operations described herein. For example, the process/method shown in FIGS. 5-8 and described in connection with this figure can be implemented by computer program instructions stored in main memory 906. When these instructions are executed by processor(s) 904, they may perform the operations as shown in FIGS. 5-8 and described above. In some embodiments, hard-wired circuitry may be used in place of or in combination with software instructions.

The storage device 908 may store various data and software modules for the operations disclosed herein. For example, the storage device 908 may store a first classification engine 908a, a second classification engine 908b, classification rules 908c for classifying text documents, an index table 908d configured to record document fingerprints and their corresponding document identification and corresponding document category or categories, and text documents 908e.

The computer system 900 also includes a communication interface 910 coupled to bus 902. Communication interface 910 provides a two-way data communication coupling to one or more network links that are connected to one or more networks. As another example, communication interface 910 may be a local area network (LAN) card to provide a data communication connection to a compatible local area network (LAN) or wide area network (WAN) component to communicated with a WAN. Wireless links may also be implemented.

The computer system 900 shown in FIG. 9 may be employed as a document classification system to perform the methods 500, 600, 700, and 800 as shown in FIGS. 5-8.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components/modules. Components may constitute either software components/modules (e.g., code embodied on a machine-readable medium) or hardware components/modules (e.g., a tangible unit capable of performing certain operations which may be configured or arranged in a certain physical manner). For example, each of the operations in FIGS. 5-8 may be performed by a module (software, hardware, or a combination of software and hardware).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method comprising:
    obtaining a plurality of text documents;
    classifying the plurality of text documents into one or more document categories based on a plurality of classification rules, wherein each of the one or more document categories include one or more first text documents of the plurality of text documents,
    identifying a second text document that is not classifiable to the one or more document categories based on the plurality of classification rules;
    after the plurality of text documents are classified into the one or more document categories based on the classification rules, generating one or more document fingerprints for respective first text documents in the one or more document categories;
    generating a second document fingerprint for the second text document; and
    classifying the second text document into one of the one or more document categories based on the fingerprint for the second text document and the one or more document fingerprints for the respective first text documents.

2. The method of claim 1, further comprising obtaining the plurality of classification rules from a rule repository.

3. The method of claim 1, further comprising generating an index table correlating the one or more document fingerprints to the respective first text documents and to one or more respective document categories.

4. The method of claim 3, wherein a first document fingerprint of the one or more document fingerprints is generated by:
    obtaining a first sequence of a respective first text document;
    generating a first hash based on the first sequence;
    obtaining a second sequence of the respective first text document, the second sequence being shifted from the first sequence;
    generating a second hash based on the second sequence; and
    generating the first document fingerprint for the respective first text document based on the first hash and the second hash.

5. The method of claim 4, wherein the first sequence and the second sequence are shifted from each other by a predetermined length of characters.

6. The method of claim 4, further comprising:
    using a same hash function to generate the first hash and the second hash.

7. The method of claim 4, further comprising:
    calculating a similarity value from the second document fingerprint and the first document fingerprint;
    determining whether the similarity value is greater than a predetermined threshold; and
    in response to determining that the similarity value is greater than the predetermined threshold, classifying the second text document into the one of the one or more document categories.

8. An apparatus comprising:
    one or more processors; and
    a memory configured to store instructions executable by the one or more processors, wherein the one or more processors are configured to execute the instructions to perform operations including:

obtaining a plurality of text documents;

classifying the plurality of text documents into one or more document categories based on a plurality of classification rules, wherein each of the one or more document categories include one or more first text documents of the plurality of text documents, identifying a second text document that is not classifiable to the one or more document categories based on the plurality of classification rules;

after the plurality of text documents are classified into the one or more document categories based on the classification rules, generating one or more document fingerprints for respective first text documents in the one or more document categories;

generating a fingerprint for the second text document; and classifying the second text document into one of the one or more document categories based on the fingerprint for the second text document and the one or more document fingerprints for the respective first text documents.

9. The apparatus of claim 8, wherein the operations further comprise:

obtaining the plurality of classification rules from a rule repository.

10. The apparatus of claim 8, wherein the operations further comprise:

generating an index table correlating the one or more document fingerprints to the respective first text documents and to one or more respective document categories.

11. The apparatus of claim 10, wherein a first document fingerprint of the one or more document fingerprints is generated by:

obtaining a first sequence of a respective first text document;

generating a first hash based on the first sequence;

obtaining a second sequence of the respective first text document, the second sequence being shifted from the first sequence;

generating a second hash based on the second sequence; and generating the first document fingerprint for the respective first text document based on the first hash and the second hash.

12. The apparatus of claim 11, wherein the first sequence and the second sequence are shifted from each other by a predetermined length of characters.

13. The apparatus of claim 11, wherein the operations further comprise:

using a same hash function to generate the first hash and the second hash.

14. The apparatus of claim 11, wherein the operations further comprise:

calculating a similarity value from the second document fingerprint and the first document fingerprint;

determining whether the similarity value is greater than a predetermined threshold; and in response to determining that the similarity value is greater than the predetermined threshold, classifying the second text document into the one of the one or more document categories.

15. A non-transitory computer-readable storage medium storing instructions that, when executed by one or more processors, cause the one or more processors to perform operations including:

obtaining a plurality of text documents;

classifying the plurality of text documents into one or more document categories based on a plurality of classification rules, wherein each of the one or more document categories include one or more first text documents of the plurality of text documents, identifying a second text document that is not classifiable to the one or more document categories based on the plurality of classification rules;

after the plurality of text documents are classified into the one or more document categories based on the classification rules, generating one or more document fingerprints for respective first text documents in the one or more document categories;

generating a second document fingerprint for the second text document; and classifying the second text document into one of the one or more document categories based on the fingerprint for the second text document and the one or more document fingerprints for the respective first text documents.

16. The non-transitory computer-readable storage medium of claim 15, wherein the operations further comprise:

obtaining the plurality of classification rules from a rule repository.

17. The non-transitory computer-readable storage medium of claim 15, wherein the operations further comprise:

generating an index table correlating the one or more document fingerprints to the respective first text documents and to one or more respective document categories.

18. The non-transitory computer-readable storage medium of claim 17, wherein a first document fingerprint of the one or more document fingerprints is generated by:

obtaining a first sequence of a respective first text document;

generating a first hash based on the first sequence;

obtaining a second sequence of the respective first text document, the second sequence being shifted from the first sequence;

generating a second hash based on the second sequence; and generating the first document fingerprint for the respective first text document based on the first hash and the second hash.

19. The non-transitory computer-readable storage medium of claim 18, wherein the operations further comprise:

using a same hash function to generate the first hash and the second hash.

20. The non-transitory computer-readable storage medium of claim 18, wherein the operations further comprise:

calculating a similarity value from the second document fingerprint and the first document fingerprint;

determining whether the similarity value is greater than a predetermined threshold; and in response to determining that the similarity value is greater than the predetermined threshold, classifying the second text document into the one of the one or more document categories.

* * * * *